(12) United States Patent
Coscarella

(10) Patent No.: US 9,140,002 B2
(45) Date of Patent: Sep. 22, 2015

(54) WEATHER BARRIER FOR A BUILDING PENETRATION

(71) Applicant: Gabe Coscarella, Edmonton (CA)

(72) Inventor: Gabe Coscarella, Edmonton (CA)

( * ) Notice: Subject to any disclaimer, the term of this patent is extended or adjusted under 35 U.S.C. 154(b) by 0 days.

(21) Appl. No.: 14/613,056

(22) Filed: Feb. 3, 2015

(65) Prior Publication Data

US 2015/0218798 A1    Aug. 6, 2015

Related U.S. Application Data

(63) Continuation-in-part of application No. 14/194,331, filed on Feb. 28, 2014.

(30) Foreign Application Priority Data

Oct. 21, 2014    (CA) .................................... 2868595

(51) Int. Cl.
| | |
|---|---|
| *E04B 1/66* | (2006.01) |
| *E04B 1/62* | (2006.01) |
| *H02G 3/22* | (2006.01) |
| *F16L 5/10* | (2006.01) |

(52) U.S. Cl.
CPC . *E04B 1/625* (2013.01); *E04B 1/66* (2013.01); *F16L 5/10* (2013.01); *H02G 3/22* (2013.01)

(58) Field of Classification Search
CPC .............. E04B 1/66; E04B 1/625; F16L 5/02; F16L 5/10; E04D 13/14; H02G 3/22
USPC ........... 52/741.3, 741.4, 220.8, 219; 277/606, 277/607, 626, 630, 637, 644, 648; 285/43, 285/192, 204, 211
See application file for complete search history.

(56) References Cited

U.S. PATENT DOCUMENTS

| | | | | |
|---|---|---|---|---|
| 3,591,190 A | * | 7/1971 | Winay et al. ................... | 277/605 |
| 3,809,350 A | * | 5/1974 | Lane ................................ | 248/57 |
| 3,881,752 A | * | 5/1975 | Fujishima ........................ | 285/46 |
| 4,548,853 A | * | 10/1985 | Bryan ............................ | 428/131 |
| 5,829,214 A | * | 11/1998 | Hart .............................. | 52/302.6 |
| 6,161,589 A | * | 12/2000 | Bolotte et al. ................ | 138/106 |
| 6,543,186 B2 | * | 4/2003 | Gilleran .......................... | 52/35 |
| 6,596,938 B2 | * | 7/2003 | Gilleran ........................... | 174/58 |
| 2006/0027388 A1 | * | 2/2006 | Collins ....................... | 174/65 R |
| 2007/0245894 A1 | * | 10/2007 | Poulis ................................ | 96/4 |
| 2008/0157518 A1 | * | 7/2008 | Cecilio ............................ | 285/42 |
| 2012/0090263 A1 | * | 4/2012 | Schaefer et al. ............. | 52/741.4 |
| 2013/0234404 A1 | * | 9/2013 | Coscarella .................... | 277/606 |
| 2014/0232106 A1 | * | 8/2014 | Mukai et al. .................. | 285/194 |
| 2014/0260044 A1 | * | 9/2014 | Gilleran ....................... | 52/506.1 |

FOREIGN PATENT DOCUMENTS

EP    2063163 A1 * 5/2009

* cited by examiner

*Primary Examiner* — Robert Canfield
(74) *Attorney, Agent, or Firm* — Christensen O'Connor Johnson Kindness PLLC

(57) ABSTRACT

A weather barrier for a building penetration. The building penetration has an opening in a wall of the building and a utility in the opening. The weather barrier has a sheet of material that is flexible and water resistant and having an outer perimeter and a resilient seal attached to the sheet of material within the outer perimeter. The sheet of material extends out around the resilient seal. The resilient seal is sized to resiliently clamp about the utility such that the resilient seal seals against and is supported by the utility when installed.

8 Claims, 7 Drawing Sheets

WEATHER BARRIER FOR A BUILDING PENETRATION

TECHNICAL FIELD

This relates to a seal for a building penetration that helps maintain the integrity of the building envelope.

BACKGROUND

New construction, such as residential homes, often requires a building envelope made from a weatherproofing material, such as Tyvek™ or other water resistant, breathable, flexible materials that that are placed on the outer walls of the building.

SUMMARY

There is provided a weather barrier for a building penetration, the penetration comprising an opening in a wall of the building and a utility in the opening. The weather barrier comprises a sheet of material that is flexible and water resistant and having an outer perimeter and a resilient seal attached to the sheet of material within the outer perimeter. The sheet of material extends out around the resilient seal. The resilient seal is sized to resiliently clamp about the utility such that the resilient seal seals against and is supported by the utility when installed.

In another aspect, the sheet of material may form a pocket within the resilient seal or the resilient seal may define an inner perimeter of an opening of the sheet of material.

In another aspect, the resilient seal may be molded, adhered or sewn to the sheet of material.

In another aspect, the resilient seal may comprise a first seal portion that extends toward a center of the resilient seal and has a first seal surface that engages the utility when installed. The first seal portion may be angled out of a plane of the resilient seal. The resilient seal may comprise a second seal portion that extends toward a center of the resilient seal and that has a second seal surface spaced from the first seal surface such that the first and second seal portions form a double seal on the utility when installed.

In another aspect, the sheet of material may be wrapped around and enclose the resilient seal.

In another aspect, the weather barrier may comprise a composite seal, the resilient seal being a part of the composite seal. The composite seal may comprise a rigid ring that supports the resilient seal. The composite seal may comprise a mating portion that engages the resilient seal, the sheet of material being retained between the resilient seal and the mating portion. The composite seal is sized to fit between an inner edge of the opening and an outer edge of the utility in the opening.

According to an aspect, there is provided a method of protecting a building penetration against weather, the penetration comprising an opening in a wall of the building and a utility in the opening, the method comprising the steps of providing a weather barrier as described above, and stretching the resilient seal and placing the resilient seal around the utility such that the resilient seal seals against and is supported by the utility.

According to an aspect, there is provided a weather barrier for a penetration in a building. The penetration comprises an opening in a wall of the building and a utility that passes through the opening. The weather barrier comprises a sheet of non-elastic material and a sheet of elastomeric material. The sheet of non-elastic material is flexible, water resistant, and air permeable, the sheet of non-elastic material having an outer perimeter and an inner perimeter, the inner perimeter defining a central passage that is larger than an outer diameter of the utility. The sheet of elastomeric material is sealably attached to the sheet of non-elastic material at the inner perimeter. The sheet of elastomeric material extends inward from the inner perimeter and defines a central opening that is smaller than the outer diameter of the utility, wherein, when the sheets of non-elastic and elastomeric material are disposed in a flat position, the sheet of non-elastic material defines a plane and the sheet of elastomeric material is parallel to and in line with the plane of the sheet of material.

In another aspect, the sheet of elastomeric material may be molded to the sheet of material.

In another aspect, the sheet of elastomeric material may have a uniform thickness within the central passage.

According to an aspect, there is provided a method of protecting a penetration in a building against weather, the penetration comprising an opening in a wall of the building and a utility that passes through the opening. The method comprises the steps of:

providing:
  a sheet of non-elastic material, the non-elastic material being flexible, water resistant, and air permeable, the sheet of material having an outer perimeter and an inner perimeter, the inner perimeter defining a central passage that is larger than an outer diameter of the utility; and
  a sheet of elastomeric material sealably attached to the sheet of non-elastic material at the inner perimeter, the sheet of elastic material extending inward from the inner perimeter and defining a central opening that is smaller than the outer diameter of the utility, wherein, when the sheets of non-elastic and elastomeric material are disposed in a flat position, the sheet of non-elastic material defines a plane and the sheet of elastomeric material is parallel to and in line with the plane of the sheet of material;

placing the sheet of elastomeric material over the utility such that the central opening of the sheet of elastomeric material stretches around and conforms to the outer diameter of the utility and such that the sheet of non-elastic material is adjacent to the wall of the building; and attaching a building wrap material and the sheet of non-elastic material on the wall of the building in an overlapping fashion.

In another the sheet of elastomeric material may be molded to the sheet of material.

In another aspect, the sheet of elastomeric material has a uniform thickness within the central passage.

In another aspect, the central opening is formed by an installer prior to the installer placing the sheet of elastomeric material over the utility.

According to an aspect, there is provided a kit for forming a weather barrier for a penetration in a building, the penetration comprising an opening in a wall of the building and a utility that passes through the opening. The kit comprises a sheet of non-elastic material and a sheet of elastomeric material. The non-elastic material being flexible, water resistant, and air permeable, the sheet of material having an outer perimeter and an inner perimeter, the inner perimeter defining a central passage that is larger than an outer diameter of the utility. The sheet of elastomeric material is sealably attached to the sheet of non-elastic material at the inner perimeter, the sheet of elastomeric material extending inward from the inner perimeter, wherein, when the sheets of non-elastic and elastomeric material are disposed in a flat position, the sheet of non-elastic material defines a plane and the sheet of elastomeric material is parallel to and in line with the plane of the sheet of material. A hand tool for forming a central opening in the sheet of elastomeric material that is smaller than the outer diameter of the utility, the central opening being sized to sealingly engage the utility when installed.

Other aspects will be apparent from the description and drawings. The various aspects may be combined or substituted in any reasonable combination.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figures 1, 2:
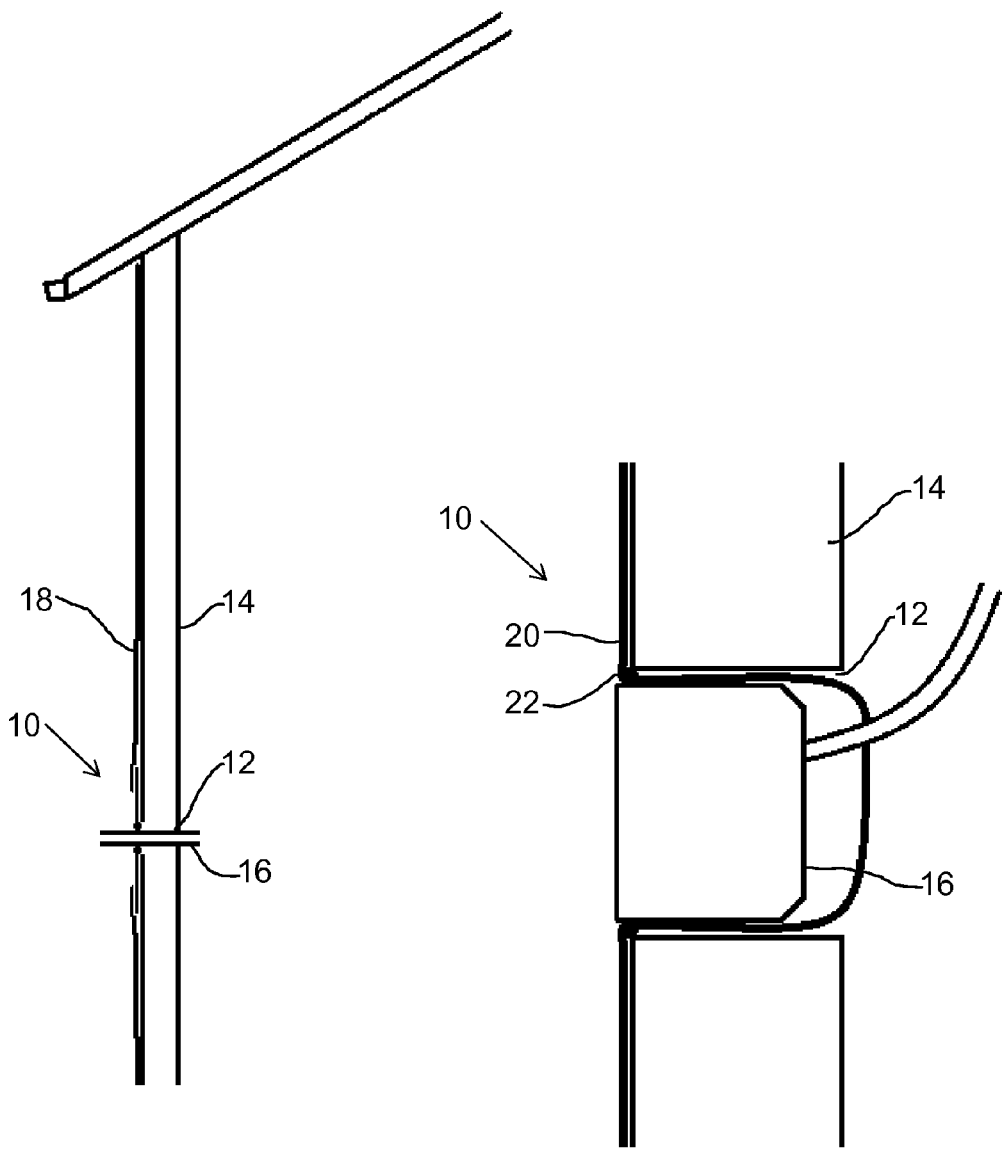
FIG. 1 is a side elevation view in section of a building with a weather barrier.
FIG. 2 is a detailed side elevation view in section of a building penetration.

A weather barrier for a building penetration, generally identified by reference numeral 10, will now be described with reference to FIGS. 1 through 11.

Referring to FIGS. 1 and 2, weather barrier 10 is designed to be used with building penetrations that have an opening 12 in a building 14, which will generally be in the wall, and a utility 16 positioned in opening 12. Utility 16 may take various forms, and is intended to include any supply line, tubing, utility box, or other component that is intended to connect services. As utility 16 may have various cross-sectional shapes, such as round, rectangular, octagonal, etc., it will be understood that weather barrier will be shaped accordingly.

Figure 3:
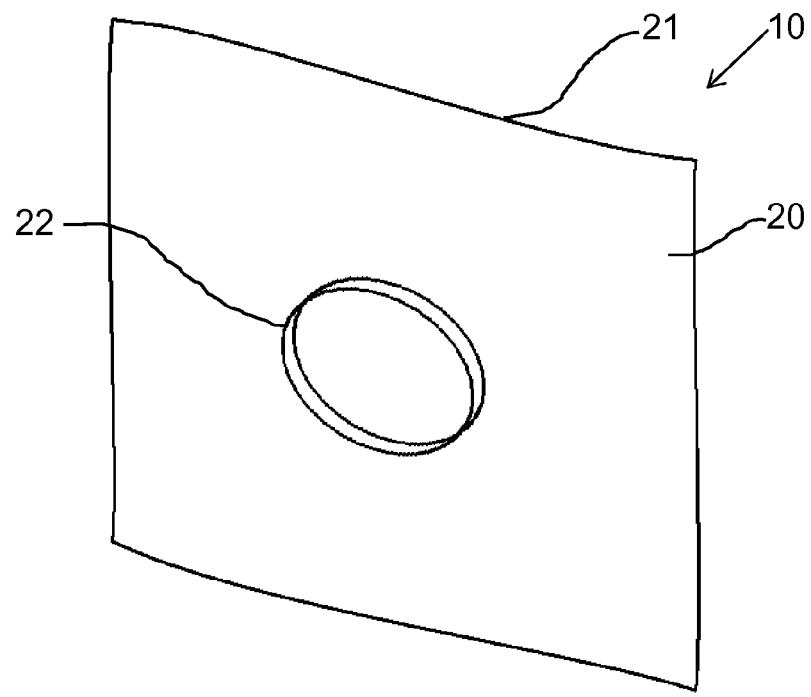
FIG. 3 is a perspective view of a weather barrier.

Referring to FIG. 3, weather barrier 10 has a sheet of material 20 that is flexible, water resistant and non-resilient. Sheet of material 20 is preferably made from a building wrap material, such as Tyvek™ that is breathable as well as water resistant, tar paper, or the like. This type of material is generally non-resilient and cannot be stretched to any appreciable degree or without damage.

A resilient seal 22 is attached to sheet of material 20 within its outer perimeter 21 such that sheet of material 20 extends out around resilient seal 22. Referring to FIG. 2, resilient seal 22 is sized to resiliently clamp about utility 16 such that resilient seal 22 seals against and is supported by utility 16 when installed. When installed, sheet of material 20 extends out around utility 16 and is large enough to cover opening 12. Sheet of material 20 can then be overlapped with the building wrap 18 on the rest of building 14 as part of the building envelope, as shown in FIG. 1.

Depending on the type of penetration, sheet of material 20 may form a pocket within the inner perimeter of resilient seal 22, such as to surround an electrical box as shown in FIG. 2, or an opening, such as to surround a pipe or other tubular body as shown in FIG. 1.

Figure 5:
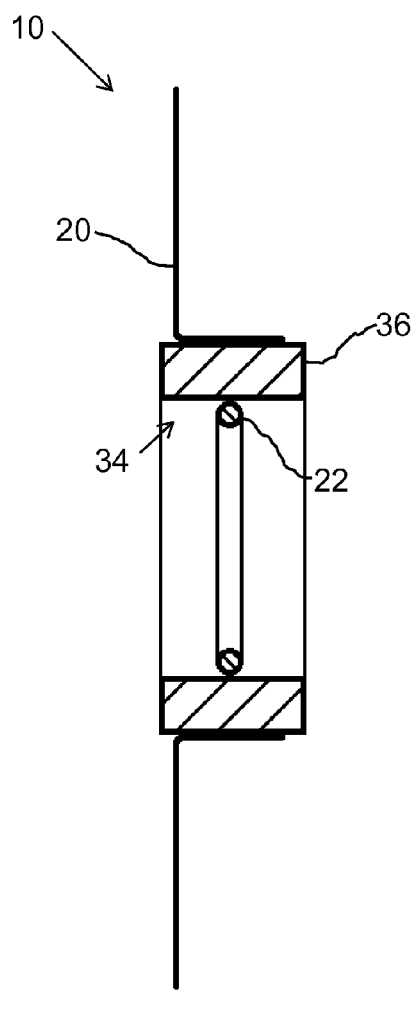
Figure 6:
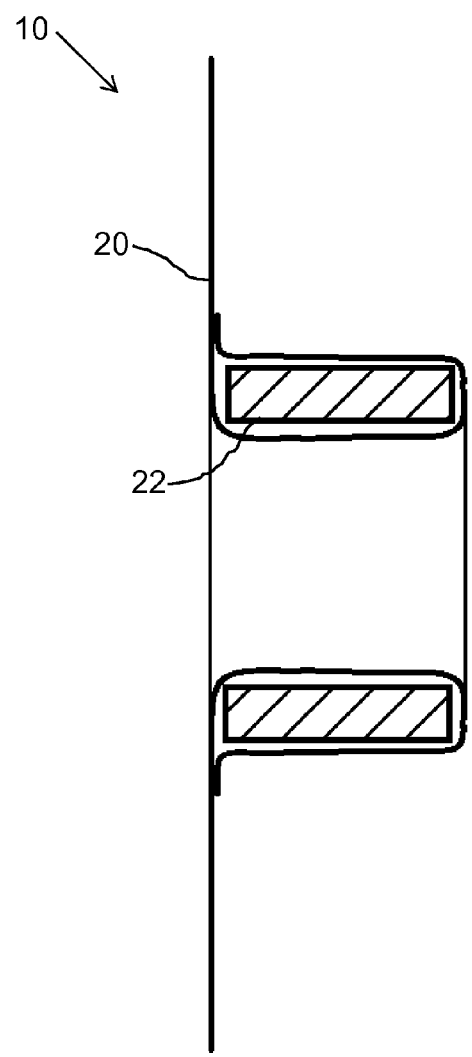
Figure 9:
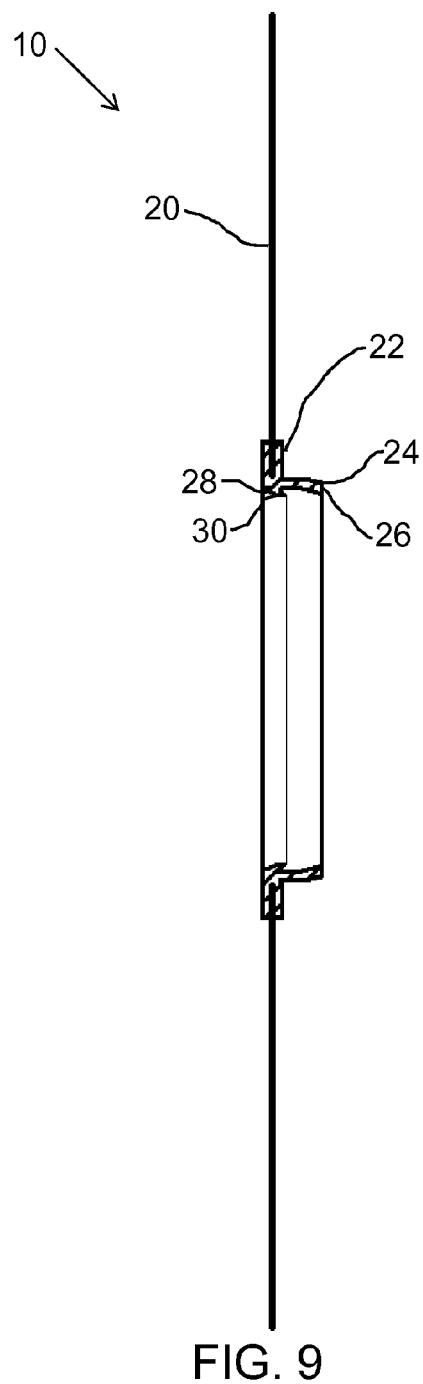
FIGS. 9-11 are side elevation views in section of alternative resilient seals.
Figure 10:
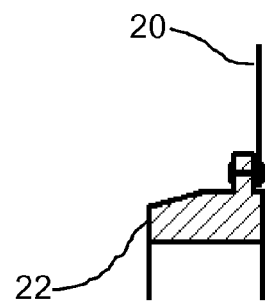

Resilient seal 22 may be attached to sheet of material 20 in various ways. For example, referring to FIG. 9, resilient seal 22 may be molded, such as by injection or compression molding, onto sheet of material 20. Sheet of material 20 may also be adhered to resilient seal 22 as shown in FIG. 5, sewn as shown in FIG. 6 or pin connected or riveted, as shown in FIG. 9. Other methods will also be apparent, When an adhesive or sewing is used, it may be desirable to wrap material 20 around resilient seal 22 as shown in FIG. 6. As sheet of material 20 does not stretch, some excess material may be required to allow resilient seal 22 room to stretch, depending on the design.

Figure 4:
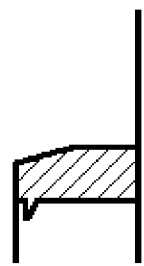
FIGS. 4-6 are side elevation views in section of weather barrier variations.

Referring to FIG. 4, in order to seal against utility 16, resilient seal 22 may have a first seal portion 24 that extends toward the center of resilient seal 22. First seal portion 24 has a first seal surface 26 that engages utility 16 when installed. As shown, first seal portion 24 is in the form of a sealing lip, and extends in from a larger body of resilient seal 22. Referring to FIG. 9, first seal portion 24 is angled out of the plane of resilient seal 22. When installed, this may extend inward into opening 12. As shown, resilient seal 22 also has a second seal portion 28 with a second seal surface 30 that extends toward a center of the resilient seal. Second seal surface 30 is spaced from first seal surface 26 such that first and second seal portions 26 and 30 are separated and form a double seal against utility 16 when installed. By doing so, the possibility of liquid entering through opening 12 is significantly reduced.

Figure 7:
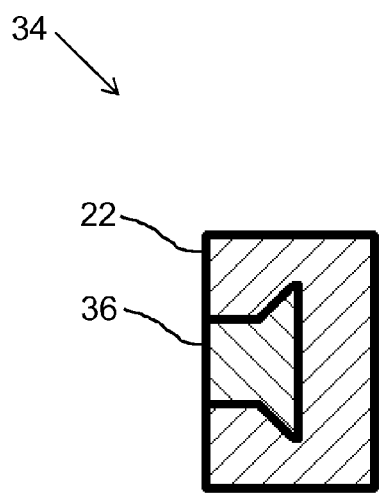
FIGS. 7 and 8 are side elevation views in section of resilient seals.
Figure 8:
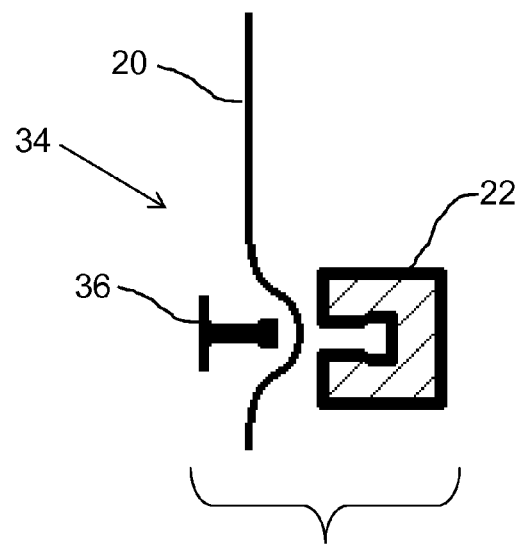
Figure 11:
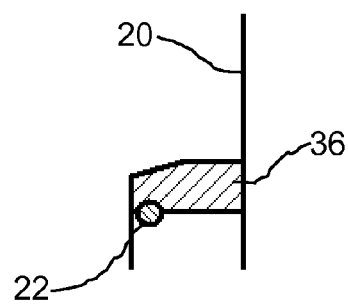

Referring to FIGS. 7 and 8, in some circumstances, resilient seal 22 may be part of a composite seal 34, or in other words, a multi-component seal. Composite seal 34 may include a second part 36 as shown. Second part 36 may be rigid or merely a different material, such as to provide more structural support or other desired properties to composite seal 34. Resilient seal 22 and second part 36 may be molded together, as shown in FIG. 7 or 11, or may be separably connected in a mating arrangement, as shown in FIG. 8, or may be carried by friction, as shown in FIG. 5. If separably connected as in FIG. 8, resilient seal 22 and second part 36 may be used to retain sheet of material 20 between resilient seal 22 and second part 36. This allows sheet of material 20 to be customized immediately prior to use or installation, if desired.

Referring to FIG. 1, resilient seal 22, or composite seal 34 as the case may be, may be sized to fit between an inner edge of opening 12 and an outer edge of utility 16 in opening 12, such that it is not disruptive to the installation of other components on building 14.

Alternative Embodiment

Referring now to FIGS. 12 through 15, an alternative embodiment for a weather barrier is shown, indicated generally by reference number 100.

Figure 12:
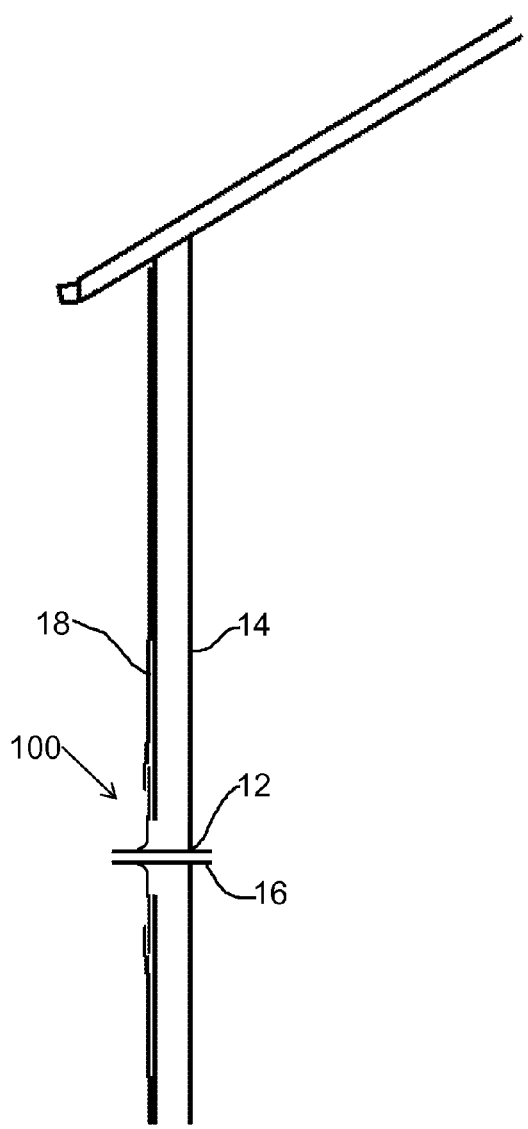
FIG. 12 is a side elevation view in section of a building with an alternative weather barrier.
Figure 14:
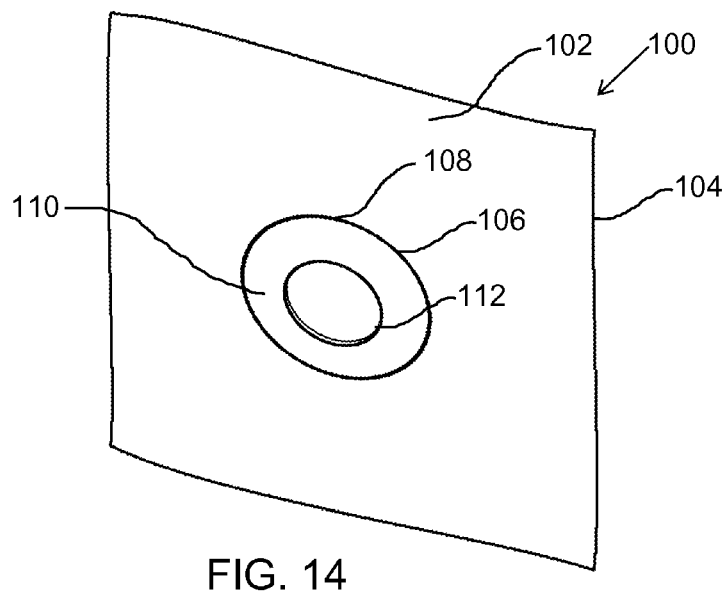
FIG. 14 is a perspective view of the alternative weather barrier.

Referring to FIG. 12, weather barrier 100 is used to for a penetration that defines an opening 12 in a building 14, which will generally be in the wall, and a utility 16 in opening 12. As will be understood from the discussion below, weather barrier 100 may be installed in a similar fashion to weather barrier 10 discussed above. Referring to FIG. 14, weather barrier 100 has a sheet of non-elastic material 102 and a sheet of elastomeric material 110. Sheet of material 102 has an outer perimeter 104 and an inner perimeter 106. Inner perimeter 106 defines a central passage 108 that is larger than an outer diameter of utility 16. Sheet of elastomeric material 110 is sealably attached to sheet of non-elastic material 102 at inner perimeter 106, where sheet of elastomeric material 110 extends inward from inner perimeter 106 and defines a central opening 112 that is smaller than the outer diameter of utility 16.

Figure 13:
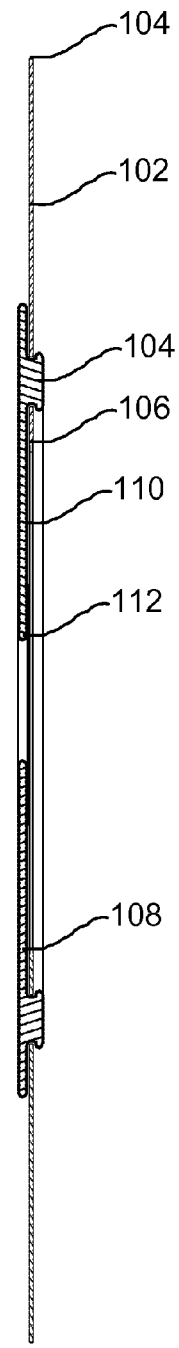
FIG. 13 is a detailed side elevation view in section of the alternative weather barrier of FIG. 12.

Sheet of non-elastic material 102 is flexible, water resistant, and air permeable, such as Tyvek, and sheet of elastomeric material 110 is capable of forming a seal on utility 16. Preferably, sheet of elastomeric material 110 is an elastomer or rubber-like material that is sufficiently thin to be flexible and deformable without losing its structural integrity. For example, sheet of elastomeric material 110 may be moldable rubber or other similar material that is a few millimeters thick or less, depending on the strength and modulus of elasticity of the selected material. Referring to FIG. 13, sheets of non-elastic and elastomeric material 102 and 110 are sufficiently flexible that, when disposed in a flat position, sheet of non-elastic material 102 defines a plane and sheet of elastomeric material 110 is parallel to and in line with the plane of sheet of material. Sheets 102 and 110 are also sufficiently thin and flexible to be easily manipulated by hand in various shapes, as is known for sheets of weatherproofing material and rubber sheets.

Sheet of elastomeric material 110 may be attached to sheet of non-elastic material in various ways, some of which are discussed above. Referring to FIG. 13, a preferred method includes molding elastomeric material that forms sheet 110 onto non-elastic sheet 102. This may be done, for example, by forming holes or slots 114 in non-elastic sheet 102 that elastomeric material is injected through to form an integral rivet-type connection, as shown.

Referring to FIGS. 12 and 13, sheet of elastomeric material 110 preferably has a uniform thickness as it extends inward from inner perimeter 106, although other designs may also be used, such as a ribbed shape with concentric circles, etc. Preferably, sheet of elastomeric material 110 is designed to properly seal against utility 16 when installed and opening 112 is sized to permit this. In some circumstances, opening 112 may be significantly smaller than utility 16, or may be only slightly smaller than utility 16, depending on the type of material selected. However, opening 112 will preferably be sized to appropriately engage and seal against utility 16. As can be seen in FIG. 12, sheet of elastomeric material 110 will generally curve outward as it engages and is pushed over utility 16.

Referring to FIG. 14, central passage 108 is circular as is central opening 112. Other shapes may be used, depending on the intended use and the shape of utility 16, which may or may not match the shape of central passage 108 and central opening 112. For example, a material with an appropriately selected modulus of elasticity may be designed to suit various shapes. Preferably, weather barrier 100 will be designed to minimize unnecessary stresses.

Figure 15:
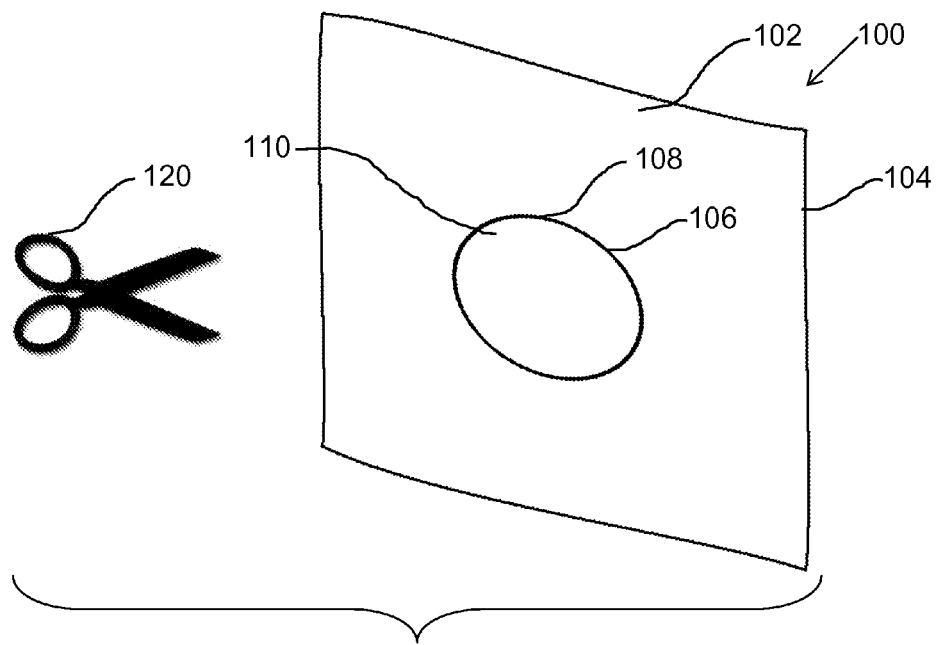
FIG. 15 is a perspective view of the alternative weather barrier without a central opening.

Referring to FIG. 15, weather barrier 100 may be provided to an installer without a central opening 112. In this situation, the installer is intended to form an appropriately sized central opening 112 that will fit the size of utility 16. This may be done using an appropriate hand tool, such as a punch with various sizes of dies, a knife with a template to guide the knife, various other cutting implements, guide lines for various sizes of holes for opening 112 marked or printed on elastomeric material 110, etc. The various cutting tools that may be used are represented by scissors 120. This approach allows an installer to have the necessary materials without having to know the exact sizes of utilities 16 that will be encountered.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A weather barrier for a penetration in a building, the penetration comprising an opening in a wall of the building and a utility that passes through the opening, the weather barrier comprising:
   a sheet of non-elastic material, the non-elastic material being flexible, water resistant, and air permeable, the sheet of non-elastic material having an outer perimeter and an inner perimeter, the inner perimeter defining a central passage that is larger than an outer diameter of the utility; and
   a sheet of elastomeric material sealably attached to the sheet of non-elastic material at the inner perimeter, the sheet of elastomeric material extending inward from the inner perimeter and defining a central opening that is smaller than the outer diameter of the utility, wherein, when the sheets of non-elastic and elastomeric material are disposed in a flat position, the sheet of non-elastic material defines a plane and the sheet of elastomeric material is parallel to the plane of the sheet of non-elastic material.

2. The weather barrier of claim 1, wherein the sheet of elastomeric material is molded to the sheet of non-elastic material.

3. The weather barrier of claim 1, wherein the sheet of elastomeric material has a uniform thickness within the central passage.

4. A method of protecting a penetration in a building against weather, the penetration comprising an opening in a wall of the building and a utility that passes through the opening, the method comprising the steps of:
   providing:
      a sheet of non-elastic material, the non-elastic material being flexible, water resistant, and air permeable, the sheet of non-elastic material having an outer perimeter and an inner perimeter, the inner perimeter defining a central passage that is larger than an outer diameter of the utility; and
      a sheet of elastomeric material sealably attached to the sheet of non-elastic material at the inner perimeter, the sheet of elastic material extending inward from the inner perimeter and defining a central opening that is smaller than the outer diameter of the utility, wherein, when the sheets of non-elastic and elastomeric material are disposed in a flat position, the sheet of non-elastic material defines a plane and the sheet of elastomeric material is parallel to the plane of the sheet of non-elastic material; and
   placing the sheet of elastomeric material over the utility such that the central opening of the sheet of elastomeric material stretches around and conforms to the outer diameter of the utility and such that the sheet of non-elastic material is adjacent to the wall of the building; and attaching a building wrap material and the sheet of non-elastic material on the wall of the building in an overlapping fashion.

5. The method of claim 4, wherein the sheet of elastomeric material is molded to the sheet of non-elastic material.

6. The method of claim 4, wherein the sheet of elastomeric material has a uniform thickness within the central passage.

7. The method of claim 4, wherein the central opening is formed by an installer prior to the installer placing the sheet of elastomeric material over the utility.

8. A kit for forming a weather barrier for a penetration in a building, the penetration comprising an opening in a wall of the building and a utility that passes through the opening, the weather barrier comprising:

a sheet of non-elastic material, the non-elastic material being flexible, water resistant, and air permeable, the sheet of non-elastic material having an outer perimeter and an inner perimeter, the inner perimeter defining a central passage that is larger than an outer diameter of the utility;

a sheet of elastomeric material sealably attached to the sheet of non-elastic material at the inner perimeter, the sheet of elastomeric material extending inward from the inner perimeter, wherein, when the sheets of non-elastic and elastomeric material are disposed in a flat position, the sheet of non-elastic material defines a plane and the sheet of elastomeric material is parallel to the plane of the sheet of non-elastic material; and a hand tool for forming a central opening in the sheet of elastomeric material that is smaller than the outer diameter of the utility, the central opening being sized to sealingly engage the utility when installed.

* * * * *